Patented Dec. 31, 1946

2,413,623

UNITED STATES PATENT OFFICE 2,413,623

PRODUCTION OF VINYL CYANIDE

Charles R. Harris, Lockport, N. Y., assignor to E. I. du Pont de Nemours & Company, Wilmington, Del., a corporation of Delaware No Drawing. Application January 22, 1944, Serial No. 519,381

6 Claims. (Cl. 260—464)

This invention relates to the manufacture of vinyl cyanide by the reaction of hydrocyanic acid with acetylene, and more particularly, to carrying out that reaction in the vapor phase in the presence of a suitable catalyst.

The production of vinyl cyanide by the vapor phase catalytic reaction between acetylene and hydrocyanic acid is described in the German Patent 559,734, issued September 23, 1932. This process may be operated simply by passing a mixture of acetylene and hydrocyanic acid over a suitable catalyst at a temperature of 350 to 700° C. Suitable catalysts for this reaction include alkali metal cyanides, or a material having a high surface activity such as activated carbon, silica gel or the like, or combinations of these. A preferred catalyst for the reaction is a carbonaceous material such as charcoal or other suitable solid support which is impregnated with an alkali metal cyanide such as sodium cyanide, potassium cyanide, lithium cyanide or the like.

An object of the present invention is to improve the above-described catalytic process for producing vinyl cyanide. A further object is to effect an increase in the proportion of gas reacted during contact with the catalyst. Other objects will be apparent from the following description of my invention.

I have discovered that considerable improvement in the above-described process can be made by mixing hydrogen with the reacting gases. The hydrogen acts in some manner not yet apparent to increase the amount of hydrocyanic acid which reacts during the passage of the reaction mixture over the surface of the catalyst.

In a preferred mode of operation, which is illustrative of the invention, I may mix one part by volume of hydrocyanic acid vapor with from more than one to three parts of acetylene and about 0.5 to 30 parts of hydrogen and pass this mixture over a catalyst consisting of charcoal impregnated with sodium cyanide or potassium cyanide, at a temperature of about 400 to 600° C. The catalyst preferably is in the form of granules of 2 to 4 mesh size and the gases are passed through a suitable layer of the granular catalyst material.

Experiments have shown that the action of the hydrogen to increase the amount of hydrocyanic acid reacting is due to some effect other than that of a mere diluent gas. In these experiments, nitrogen and hydrogen were added to the reaction mixture of acetylene and hydrocyanic acid in comparative runs. In each run, one part by volume of hydrocyanic acid was mixed with 2 parts of acetylene, and 7 parts of the diluent gas (nitrogen or hydrogen) was added before flowing the mixture over the catalyst. The catalyst used was granular charcoal impregnated with sodium cyanide. The reaction temperature was maintained at about 500 to 600° C. In the run using nitrogen, after 20 hours of operation, the nitrogen addition was replaced with hydrogen. The results obtained are shown in the following table:

| Run | A | B |
| --- | --- | --- |
| Diluent used | $H_2$ | N |
| Per cent HCN reacting: | Per cent | Per cent |
| Start | 95 | 72 |
| After 10 hours | 82 | 44 |
| After 20 hours | 60 | 16 |
| After change to $H_2$ | | 61 |

The practice of my invention is not restricted to the preferred mode of operation as disclosed above. The proportions of hydrocyanic acid and acetylene may be varied over a wide range, provided that there is an excess of acetylene. Generally best results are obtained with about 1.5 to 3 parts by volume of acetylene to one part of hydrocyanic acid. Smaller amounts of acetylene, e. g., as low as 1.05 mol per mol of hydrocyanic acid, may be used but generally are less satisfactory. The method for bringing the reacting gases into contact with the catalyst may be varied as desired and the various known methods common to catalytic processes may be employed.

The proportion of hydrogen in the gas mixture may be varied over a wide range, provided the reaction mixture contains at least about 2% by volume of hydrogen and about 0.05 to 98 parts by volume of hydrogen for each part by volume of hydrocyanic acid initially present. The reaction mixture initially may contain about 1 to 20% by volume of hydrocyanic acid, preferably 3 to 15%. The initial acetylene concentration will be greater than that of the hydrocyanic acid; preferably the mixture will initially contain about 1.05 to 3 mols of acetylene for each mol of hydrocyanic acid present. The remainder of the reaction mixture (from about 2% to 98% by volume) may be hydrogen or a mixture of hydrogen with diluent gases such as nitrogen, natural gas or other hydrocarbon gases or vapors. In any case, the amount of hydrogen must equal at least 2% of the total volume. It is generally preferred to omit the diluent gases and use a reaction mixture at least 90% of which consists of hydrocyanic acid, acetylene and hydrogen. Generally, the best results are obtained with a reaction mixture initially containing one part by volume of hydrocyanic acid, about 1.05 to 3 parts by volume of acetylene and 0.5 to 30 parts by volume of hydrogen.

The hydrogen may be mixed with the reactant gases before contact with the catalyst in any desired manner, or the hydrogen may be added separately to the reaction chamber so as to come in contact with the reactant gases at or near the catalyst surface.

The various types of catalytic bodies known to be suitable for reacting acetylene with hydrocyanic acid may be used in practicing my invention. Generally, I prefer to use an alkali metal cyanide, or a mixture of alkali metal cyanides, supported on a solid, granular material. While I prefer to use ordinary wood charcoal as the catalyst support, other solid materials, e. g., coke, activated carbons, alumina, silica or the like may be used.

I claim:

1. A process for the production of vinyl cyanide which comprises reacting hydrocyanic acid with acetylene in the vapor phase at a temperature of 350 to 700° C. in the presence of an alkali metal cyanide catalyst, the reaction mixture initially containing, for each volume of hydrocyanic acid 1.05 to 3 volumes of acetylene and 0.5 to 98 volumes of hydrogen, said mixture containing not less than about 2% by volume of hydrogen.

2. A process for the production of vinyl cyanide which comprises reacting hydrocyanic acid with acetylene in the vapor phase at a temperature of 350 to 700° C. in the presence of a catalyst comprising an alkali metal cyanide supported on a solid material, the reaction mixture initially containing, for each volume of hydrocyanic acid, 1.05 to 3 volumes of acetylene and 0.5 to 30 volumes of hydrogen, said mixture containing not less than about 2% by volume of hydrogen.

3. In a process for the production of vinyl cyanide by reacting hydrocyanic acid with acetylene in the vapor phase, the step comprising bringing into contact with an alkali metal cyanide catalyst at a temperature of 350 to 700° C., a reaction mixture, at least 90% of which initially consists of hydrocyanic acid, acetylene and hydrogen and which initially contains for each volume of hydrocyanic acid, 1.05 to 3 volumes of acetylene and 0.5 to 98 volumes of hydrogen, said mixture initially containing at least 2% by volume of hydrogen.

4. In a process for the production of vinyl cyanide by reacting hydrocyanic acid with acetylene in the vapor phase, the step comprising bringing into contact with a catalyst comprising a carbonaceous material impregnated with at least one alkali metal cyanide at a temperature of 350 to 700° C., a reaction mixture, at least 90% of which initially consists of hydrocyanic acid, acetylene and hydrogen and which initially contains for each volume of hydrocyanic acid, 1.05 to 3 volumes of acetylene and 0.5 to 30 volumes of hydrogen.

5. In a process for the production of vinyl cyanide by reacting hydrocyanic acid with acetylene in the vapor phase, the step comprising bringing into contact with a catalyst comprising a carbonaceous material impregnated with at least one alkali metal cyanide at a temperature of 350 to 700° C., a reaction mixture, at least 90% of which initially consists of hydrocyanic acid, acetylene and hydrogen and which initially contains for each volume of hydrocyanic acid, 1.05 to 3 volumes of acetylene and 0.5 to 30 volumes of hydrogen, said mixture initially containing about 3 to 15% by volume of hydrocyanic acid.

6. A process for the production of vinyl cyanide which comprises reacting hydrocyanic acid with acetylene in the vapor phase at a temperature of 350 to 700° C. in the presence of a catalyst comprising charcoal impregnated with at least one alkali metal cyanide, the reaction mixture initially containing, for each volume of hydrocyanic acid, 1.05 to 3 volumes of acetylene and 0.5 to 30 volumes of hydrogen, said mixture containing not less than about 2% by volume of hydrogen.

CHARLES R. HARRIS.